United States Patent
Chen (10) Patent No.: US 9,798,841 B2
(45) Date of Patent: Oct. 24, 2017

(54) SYSTEMS AND METHODS OF CONDUCTING NUMERICAL SIMULATION OF AN UNDERWATER EXPLOSION

(71) Applicant: Livermore Software Technology Corporation, Livermore, CA (US)

(72) Inventor: Hao Chen, Pleasanton, CA (US)

(73) Assignee: Livermore Software Technology Corp., Livermore, CA (US)

( * ) Notice: Subject to any disclaimer, the term of this patent is extended or adjusted under 35 U.S.C. 154(b) by 310 days.

(21) Appl. No.: 14/854,309

(22) Filed: Sep. 15, 2015

(65) Prior Publication Data

US 2017/0076026 A1 Mar. 16, 2017

(51) Int. Cl.
*G06F 17/50* (2006.01)
(52) U.S. Cl.
CPC .............................. *G06F 17/5018* (2013.01)
(58) Field of Classification Search
USPC .................................. 703/2, 18, 6; 345/583
See application file for complete search history.

(56) References Cited

U.S. PATENT DOCUMENTS

| | | | | |
|---|---|---|---|---|
| 8,200,464 B2* | 6/2012 | Slavik | .................. | G06F 17/5018 703/2 |
| 2010/0256957 A1* | 10/2010 | Slavik | .................. | G06F 17/5018 703/2 |
| 2011/0096083 A1* | 4/2011 | Schultz | .................. | G06T 15/04 345/583 |
| 2016/0298936 A1* | 10/2016 | Thouless | .................. | F41H 1/04 |
| 2016/0321839 A1* | 11/2016 | Schultz | .................. | G06T 15/04 |

* cited by examiner

*Primary Examiner* — Thai Phan
(74) *Attorney, Agent, or Firm* — Roger H. Chu (57) ABSTRACT

Characteristics of a blast source and a FEA model representing a surrounding fluid domain are defined. One layer of new border nodes and elements are created outside of the fluid domain's original outer boundary formed by the original border elements. Each new border element/node is associated with one of the original border elements/nodes as corresponding master element/node. At each time step of a time-marching simulation of an underwater explosion, simulated fluid behaviors are computed for all but the new border elements. The computed fluid behaviors of each original border element are saved into a corresponding lookup table configured to store the computed fluid behaviors for a predefined number of time steps in a first-in-first-out manner. Simulated fluid behaviors of each new border element are determined by interpolating, with the calculated blast wave propagation time from the master element, the stored fluid behaviors in the corresponding master element's lookup table.

20 Claims, 10 Drawing Sheets

| t | stresses | history variables | nodal velocities |
|---|---|---|---|
| t-Δt | | | |
| t-2Δt | | | |
| ⋮ | | | |
| t-nΔt | | | |

SYSTEMS AND METHODS OF CONDUCTING NUMERICAL SIMULATION OF AN UNDERWATER EXPLOSION

FIELD

The present invention generally relates to methods, systems and software product used in computer-aided engineering analysis, more particularly to method of conducting efficient numerical simulation of underwater explosion.

BACKGROUND

Finite element analysis (FEA) is a computer implemented method using a numerical technique for finding approximate solutions of partial differential equations representing complex systems such as three-dimensional non-linear structural design and analysis. The FEA originated from the need for solving complex elasticity and structural analysis problems in civil and aeronautical engineering. With the advance of the computer technology, FEA has become a vital tool for assisting engineers and scientists to make decisions in improving structural design (e.g., automobile, airplane, etc.). When applying FEA in solving a physical problem or event in time domain, it is referred to as a time-marching simulation. In general, a time-marching simulation comprises a number of solution cycles. A FEA result or solution is obtained at each solution cycle as a snap-shot of the total simulation at a particular time.

As popularity of the FEA grows, the use of FEA has been adapted to simulate more complex physical phenomena, for example, fluid behaviors due to an underwater explosion. To numerically simulate such behaviors, a technique referred to as Arbitrary Lagrangian-Eulerian (ALE) based finite element analysis (FEA) method is preferably used.

A common practice for conducting numerical simulation of an underwater explosion using the ALE based FEA method is to only model a limited portion of a fluid domain due to limitation of computing resources. Element stress wave originated inside the fluid domain, as result of the blast, would get reflected at the FEA model's boundary. When the boundary is modeled relatively too close to the blast source, such stress wave reflections cause incorrect simulation results. Prior art approaches to correct this problem/shortcoming is either to enlarge the FEA model or to apply artificial normal and shear stresses at the FEA model's boundary to compensate effects of such stress wave reflections. Although the prior art approaches may reduce some effects, it cannot eliminate them. Furthermore, the prior art approaches require many ad hoc techniques that are not easy to practice.

It would, therefore, be desirable to have improved systems and methods of conducting time-marching numerical simulation of underwater explosion to avoid the aforementioned shortcomings.

BRIEF SUMMARY

This section is for the purpose of summarizing some aspects of the present invention and to briefly introduce some preferred embodiments. Simplifications or omissions in this section as well as in the abstract and the title herein may be made to avoid obscuring the purpose of the section. Such simplifications or omissions are not intended to limit the scope of the present invention.

Systems and methods of conducting a time-marching numerical simulation of an underwater explosion are disclosed. According to one aspect, characteristics of an underwater blast source and a finite element analysis (FEA) model containing a number of nodes connected by a number of finite elements representing a fluid domain surrounding the blast source are defined and received in a computer system. An Arbitrary Lagrangian-Eulerian (ALE) based finite element analysis (FEA) application module is installed in the computer system. The FEA model may represent only a portion of the fluid domain due to geometric symmetry.

Nodes and elements located on the original outer boundary of the fluid domain are identified as original border nodes and origin border elements, respectively. One extra layer of new border nodes and new border elements are then created outside of the original outer boundary of the fluid domain between the original border nodes and the new border nodes. The new border elements are so sized that none of the new border elements is smaller than the smallest one of the original border elements. Each new border element/node is associated with one of the original border elements/nodes as corresponding master element/node.

Simulated fluid behaviors as a result of an underwater explosion originated from the blast source are obtained in a time-marching numerical simulation using the modified FEA model for a predetermined duration in a number of time steps.

At each time step of the time-marching simulation, simulated fluid behaviors are computed for all but the new border elements with the ALE based FEA module. The computed fluid behaviors of the original border elements are then saved into respective lookup tables with one table per each original border element. Each lookup buffer is configured to store the computed fluid behaviors for a predefined number of time steps in a first-in-first-out (FIFO) manner.

Simulated fluid behaviors of each new border element are determined by interpolating, with the calculated blast wave propagation time from the corresponding master element to each new border element, the stored fluid behaviors in the corresponding master element's lookup buffer.

Objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

DETAILED DESCRIPTION

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, and components have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1A-10. However, those skilled in the art will readily appreciate that the detailed description given herein with respect to these figures is for explanatory purposes as the invention extends beyond these limited embodiments.

Figure 1A:
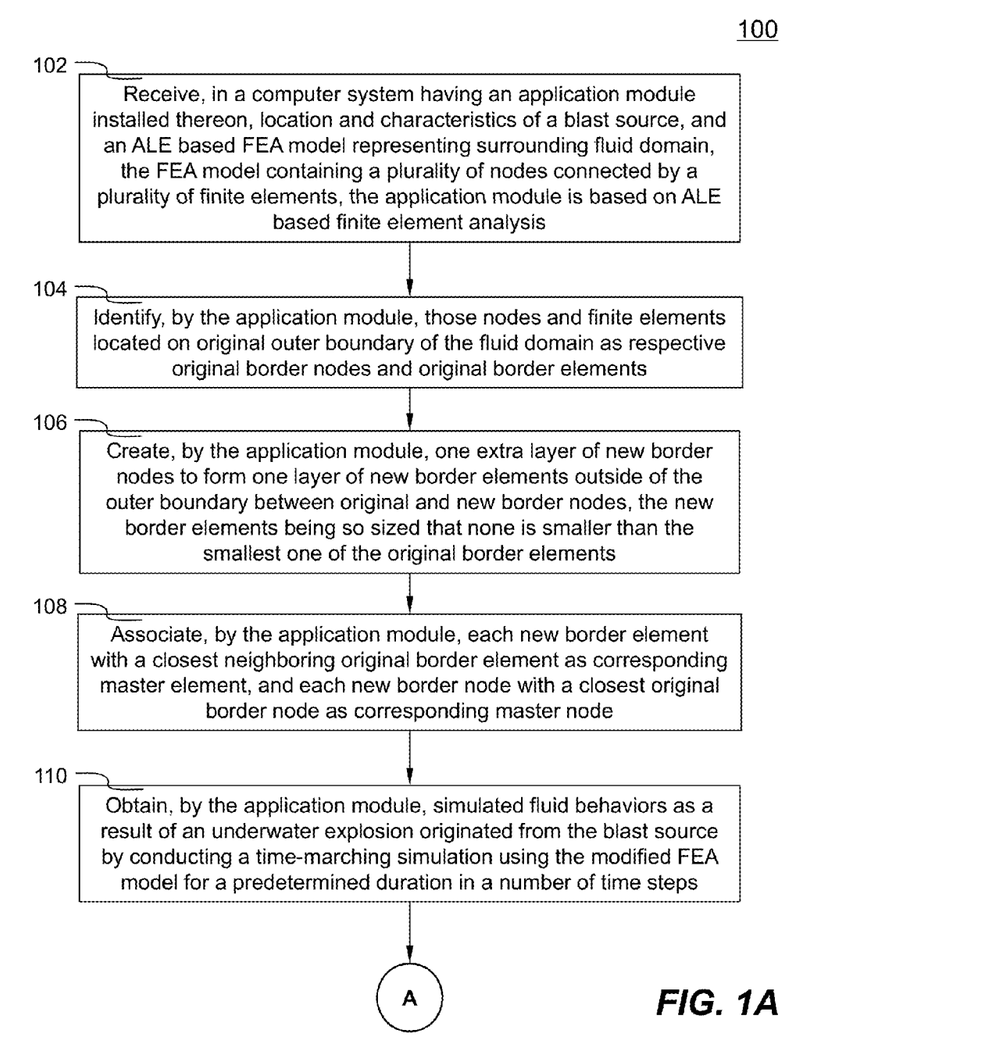
FIGS. 1A-1B collectively is a flowchart illustrating an example process of conducting a time-marching numerical simulation of an underwater explosion in accordance with one embodiment of the present invention.
Figure 1B:
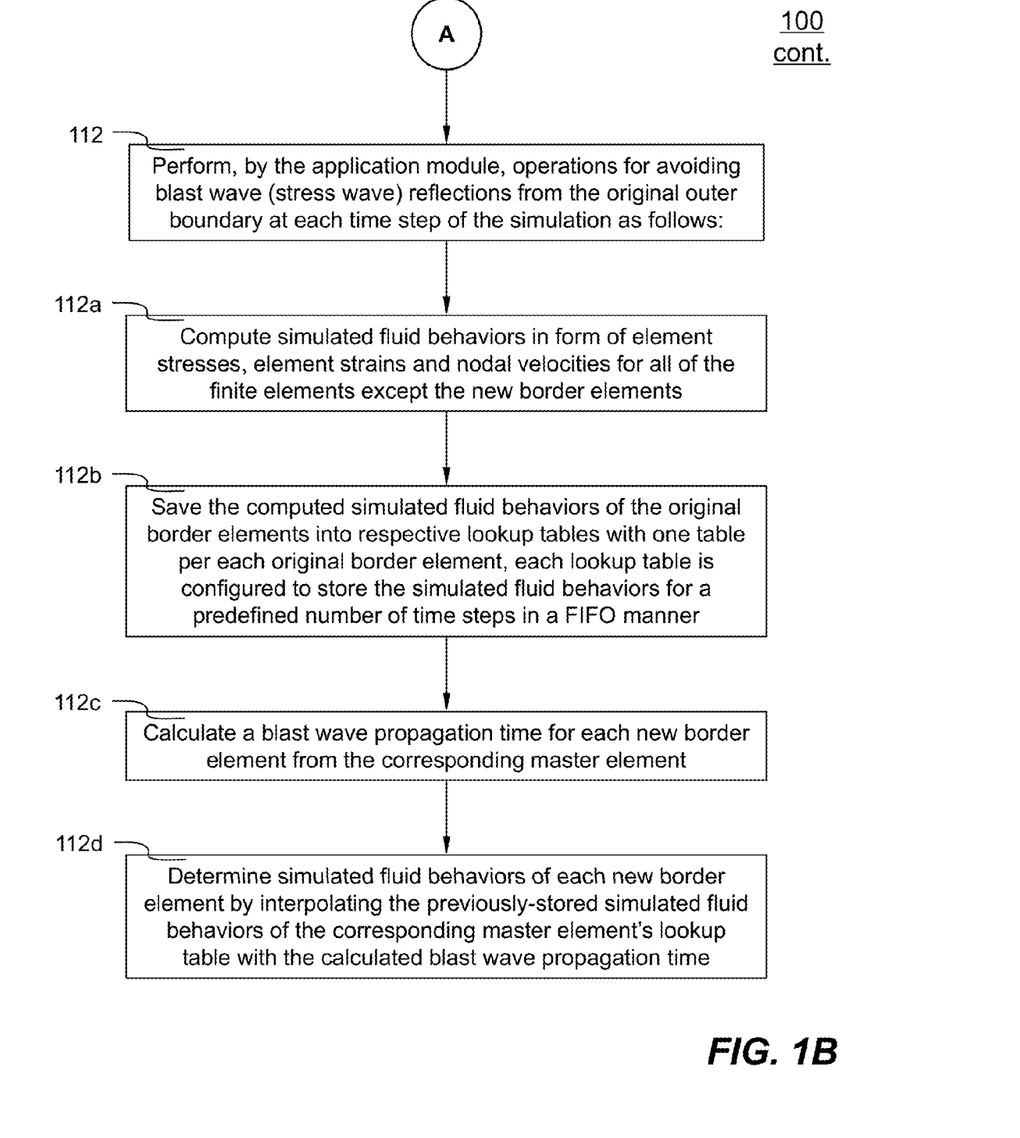

Referring first to FIGS. 1A-1B, it is collectively shown a flowchart illustrating an example process 100 of conducting a time-marching numerical simulation an underwater explosion, according to an embodiment of the present invention. Process 100 can be implemented in software (e.g., an ALE based FEA application module) and is preferably understood with other figures.

Figure 2:
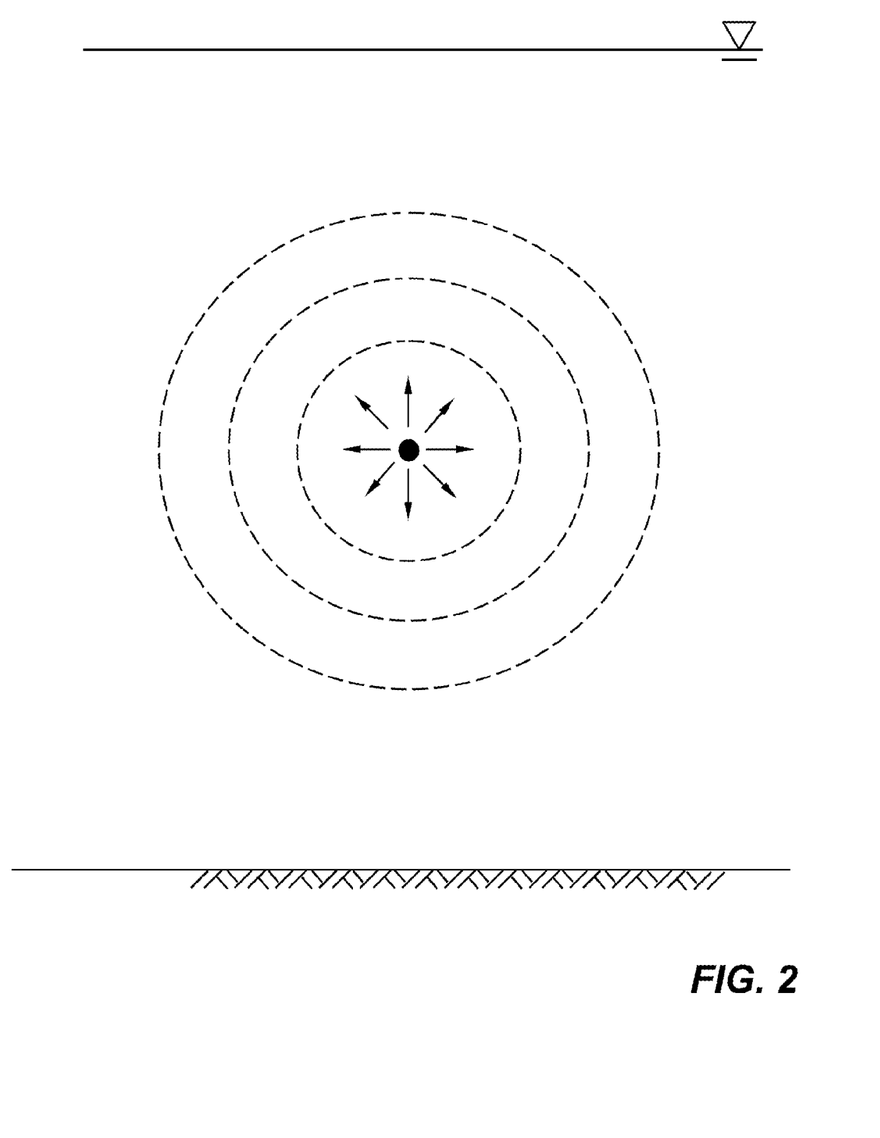
FIG. 2 is an elevation view depicting an example underwater explosion originated from a blast source.

FIG. 2 depicts an elevation view showing a blast source (shown as solid dot) with blast waves (shown in dotted circles) propagating through a fluid domain in an example underwater explosion. Numerical simulation of such an underwater explosion may be conducted using one embodiment of the present invention.

Process 100 starts by receiving characteristics of an underwater blast source and a finite element analysis (FEA) model representing a fluid domain surrounding the blast source in a computer system (e.g., computer system 1000 in FIG. 10) having an arbitrary Lagrangian-Eulerian (ALE) based FEA application module installed thereon at action 102.

Figure 3A:
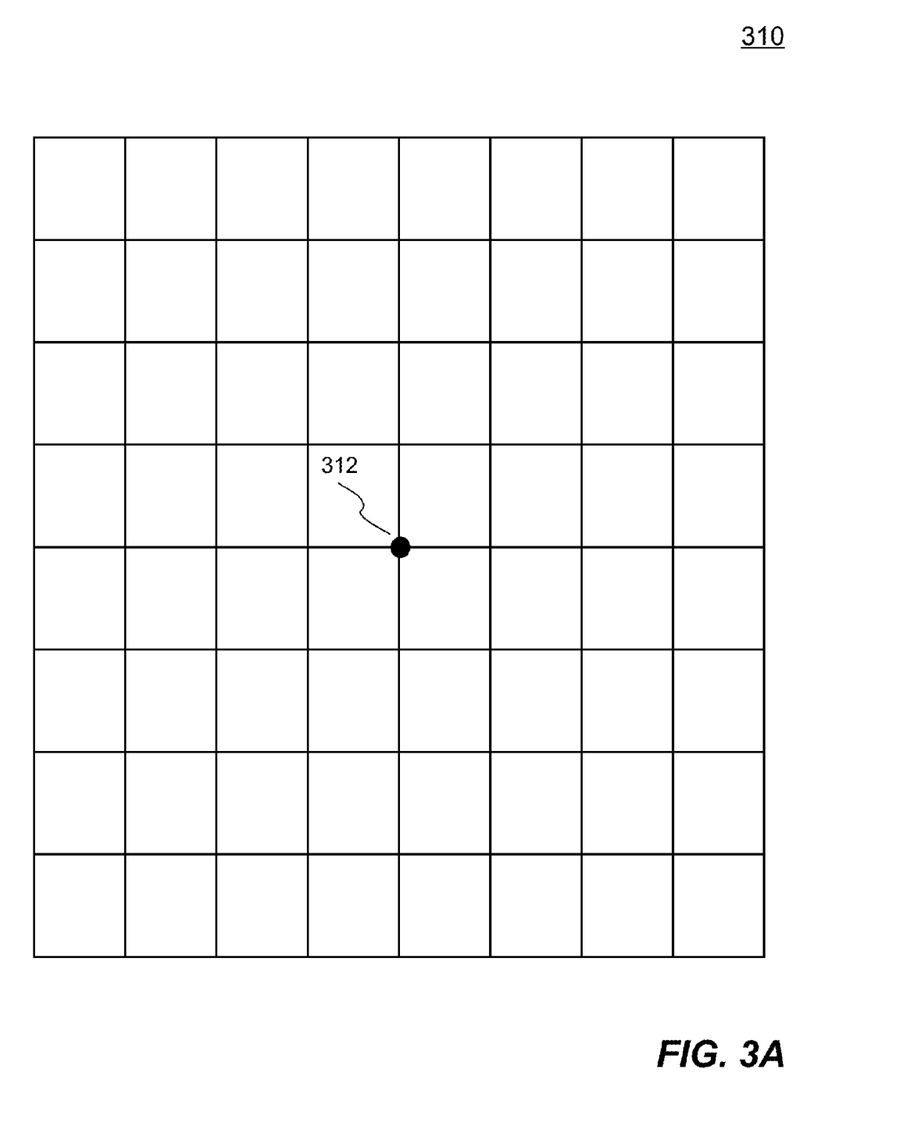
FIGS. 3A-3C are diagrams showing example FEA models representing a fluid domain and location of a blast source in accordance with one embodiment of the present invention.
Figure 3B:
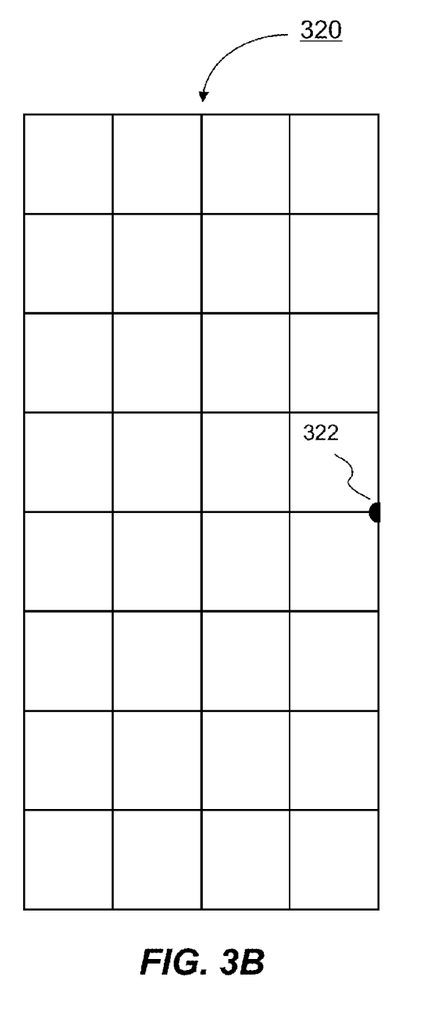
Figure 3C:
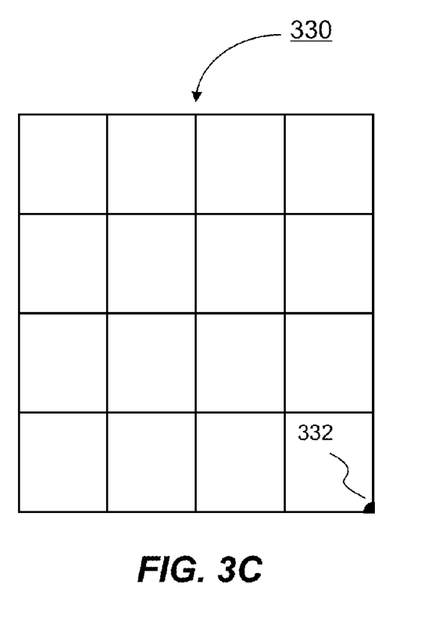

The FEA model contains a number of nodes connected by a number of finite elements. A first example FEA model 310 with a blast source 312 is shown in FIG. 3A. Alternatively, due to geometric symmetry, second and third FEA models 320-330 with blast sources 322-332 are shown in FIG. 3B and FIG. 3C, respectively. For illustration simplicity, these FEA models 310-330 are drawn in two-dimension. For those having ordinary skill in the art would know that the FEA model can be drawn in three-dimension.

Figure 4A:
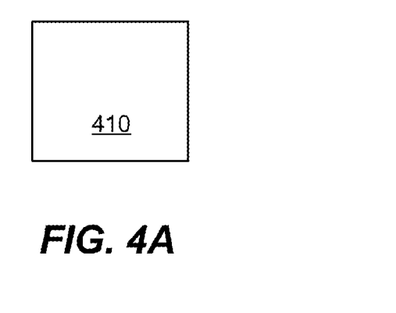
FIG. 4A is a diagram showing example 4-node quadrilateral finite element that can be used for representing fluid in two-dimensional space, according to an embodiment of the present invention.
Figure 4B:
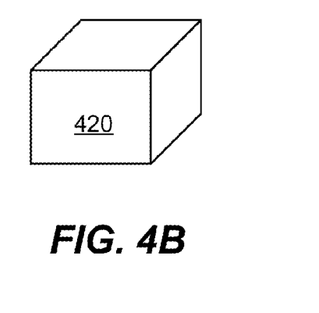
FIG. 4B is a diagram showing example 8-node hexahedral finite element that can be used for representing fluid in three-dimensional space, according to an embodiment of the present invention.

Example finite elements may be used in the example FEA model are shown in FIGS. 4A-4B: 4-node quadrilateral element 410 in two-dimension and 8-node hexahedral finite element 420 in three-dimension.

Figure 5:
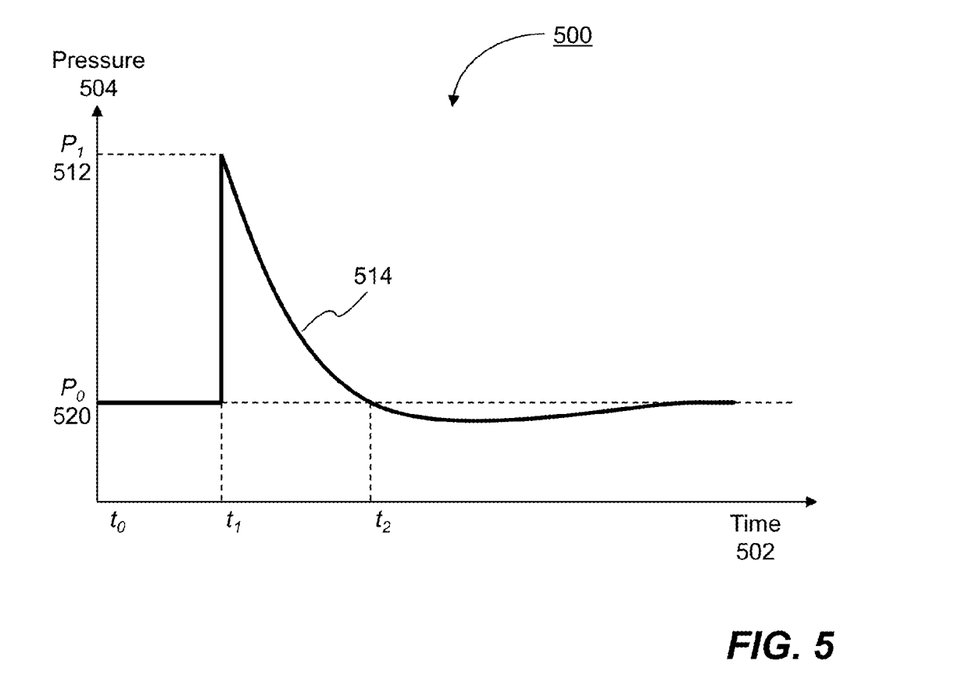
FIG. 5 is an X-Y plot showing an example relationship of blast pressure versus time in accordance with one embodiment of the present invention.

The characteristics of an underwater blast source include at least a location of the blast source (e.g., blast sources 313, 322, 332 in FIGS. 3A-3C) and a blast wave velocity and pressure. FIG. 5 is an X-Y plot showing an exemplary curve of pressure 504 versus time 502 of the blast pressure 500 due to an explosion at a particular location in accordance with one embodiment of the present invention. Blast pressure 500 is equal to an initial ambient pressure $P_0$ 520 (e.g., atmosphere pressure in an open space) when time is at zero or $t_0$, and stays constant until time $t_1$. Blast pressure 500 then jumps to peak pressure $P_1$ 512, which corresponds to the moment when the blast wave reaches the particular location. The magnitude of the peak pressure $P_1$ 512 is a function of distance between the particular location and the blast source, and the mass of the blast source. Blast pressure 500 drops off thereafter. Depending upon types of transmission medium (e.g., air, water) and the particular location, the trailing portion 514 of the blast pressure 500 can decay in various forms.

Figure 6:
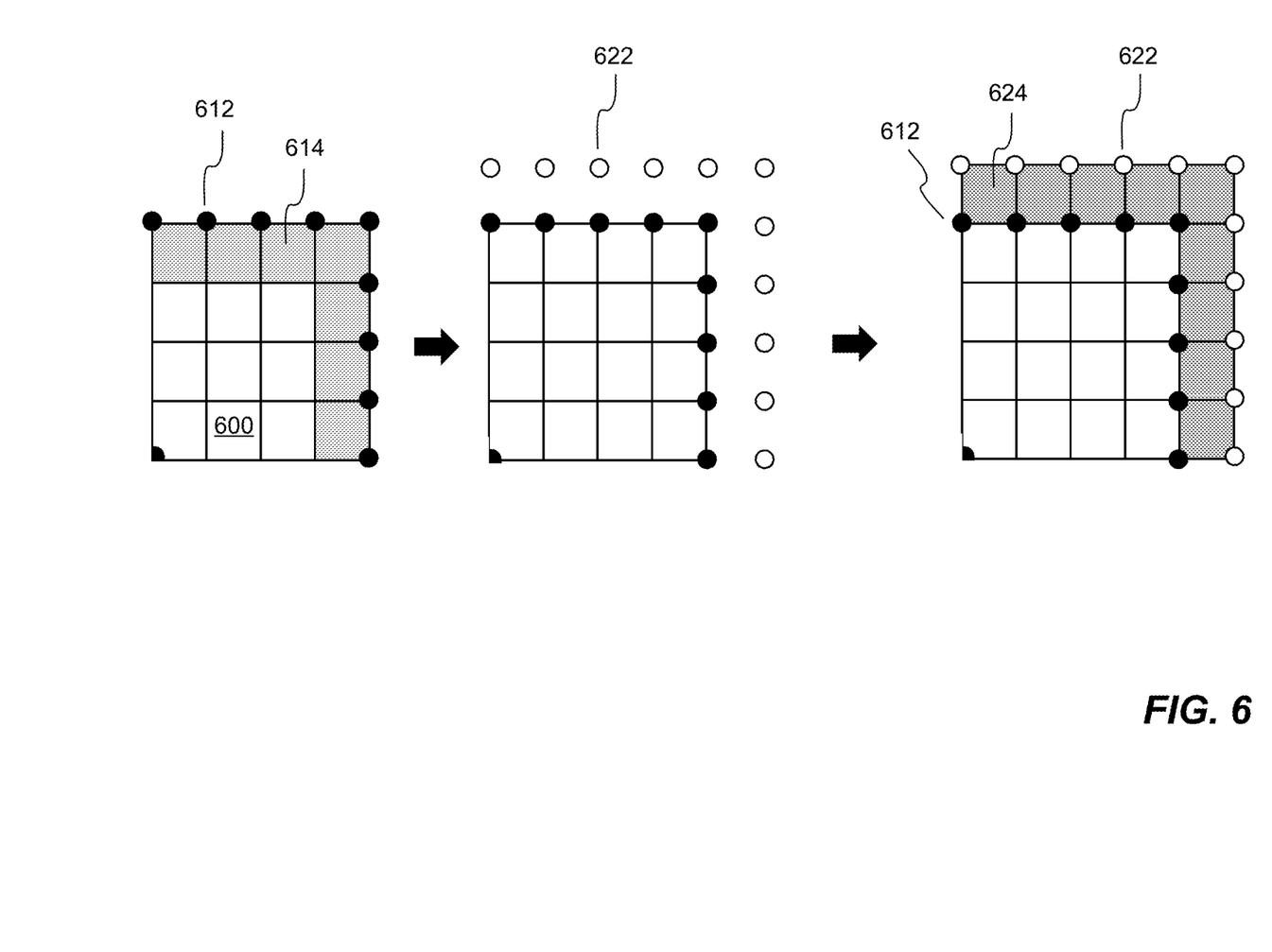
FIG. 6 shows a series of diagrams illustrating a sequence of creating an extra layer of new border nodes/elements of an example FEA in accordance with one embodiment of the present invention.

Referring back to process 100, at action 104, those nodes and finite elements located on the fluid domain's original outer boundary (i.e., the border the FEA model) are identified as original border nodes and original border elements, respectively. FIG. 6 shows an example FEA model 600 having original border nodes 612 (solid dots) and original border elements 614 (lighter shaded elements). Next, at action 106, one extra layer of new border nodes 622 are created to form one layer of new border elements 624 (darker shaded elements) between the original border nodes 612 and the new border nodes 622. The new border elements 624 are so sized that none of the new border elements 624 is smaller than the smallest one of the original border elements 614.

At action 108, each new border element is associated with the closest neighboring original border element as its master element and each new border node is associated with the closest one of the original border nodes as its master node.

Figure 7A:
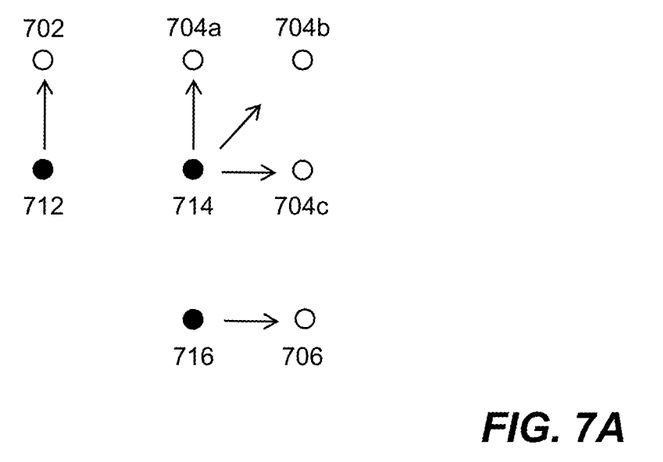
FIGS. 7A-7B are diagrams showing example associations of new border nodes/elements with corresponding master node/element in accordance with an embodiment of the present invention.
Figure 7B:
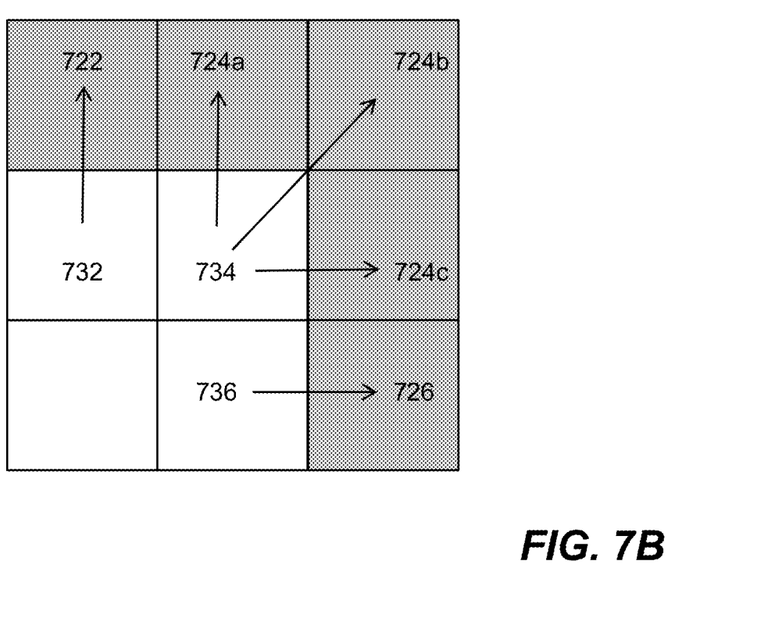

Example of the node associations are shown in FIG. 7A, new border node 702 is associated with a first original border node 712 as its master node. A second original border node 714 is the master node for three new border nodes 704a-704c. Further, a third original border node 716 is the master node for new border node 706. FIG. 7B shows example element associations. A first original border element 732 is the master element of new border element 722. The second original border element 734 is the master element for three new border elements 724a-724c. The third original border element 736 is the master element for new border element 726.

Then at action 110, simulated fluid behaviors as a result of an underwater explosion originated from the blast source are obtained by conducting a time-marching simulation using the modified FEA model (i.e., the original FEA model with an extra layer of new border elements) for a predetermined duration in a number of time steps. The duration can be predetermined by a user or by a feature in the ALE based FEA application module. In one embodiment, a user can set the duration of simulation by inputting a value (e.g., 0.1 second, 0.5 second. etc.). In another embodiment, the application module can have a default value (e.g., 0.25 second, 0.75 second, etc.). In yet another embodiment, the application module can have an option to detect a particular end condition (e.g., blast wave has decayed below a threshold, etc.).

Next, at action 112, to avoid blast wave (stress wave) reflections from the original outer boundary at each time, the following operations/actions are performed by the ALE based FEA module. At action 112a, simulated fluid behaviors are computed for all but the new border elements. In other words, all of the finite elements in the original FEA model are treated like interior finite elements thereby no blast wave/stress wave reflections would occur. The simulated fluid behaviors include at least the element stresses, the element strains and nodal velocities for each finite element. For finite elements having non-linear material properties, the simulated fluid behaviors further include element history variables for reconstruct non-linear events (e.g., loading and unloading paths).

Figure 8:
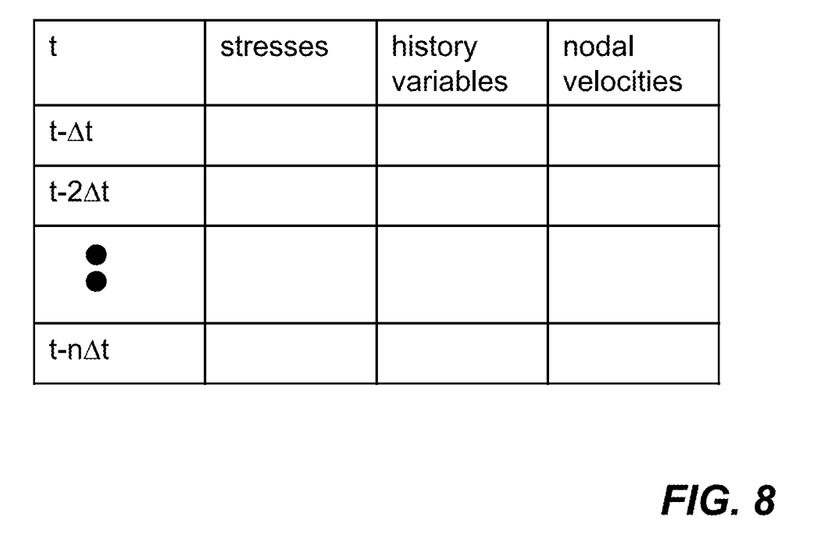
FIG. 8 is a diagram showing a data structure of an example lookup table according to an embodiment of the present invention.

At action 112b, the computed simulated fluid behaviors of the original border elements and nodes are saved into respective lookup tables with one table per original border element. Each table is configured to store simulated fluid behaviors for a predefined number of time steps in a first-in-first-out (FIFO) manner. FIG. 8 shows an example data structure of a lookup table. Fluid behaviors in form of element stresses, element strains, nodal velocities, and optional element history variables are stored for a predefined number of time steps (e.g., steps t, t-$\Delta$t, t-2$\Delta$t, . . . , t-n$\Delta$t). "t" represents the current simulation time, while $\Delta$t represents the size of each time step. "n" is a whole number. In this example, the predefined number is "n+1".

Figure 9:
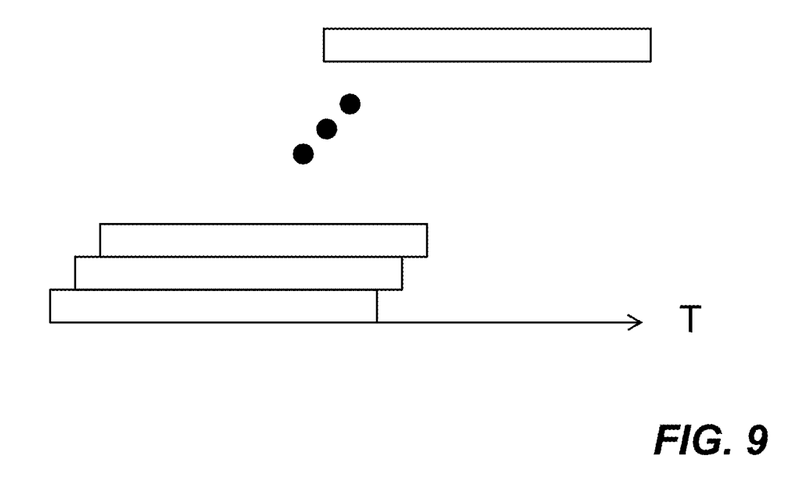
FIG. 9 is a diagram illustrating an example sliding window of time for the duration of a time-marching numerical simulation, according to an embodiment of the present invention.

The FIFO table shown in FIG. 9 comprises a slide window of time of the duration of the time-marching simulation. The size of the lookup table depends upon the predefined number of time steps, which can be determined by certain features in the ALE based FEA application module (e.g., default value, user-defined value, etc.). For those having ordinary skill in the art would know that the sliding window holds computed results for a predefined number of time steps that moves forward with the simulation time (t). In other words, as the simulation marches forward in time, the latest computed results are stored into the lookup table, while the oldest saved results are removed (i.e., first-in-first-out).

At action 112c, the blast wave propagation time from the corresponding master element to each new border element is calculated. One example scheme is to divide the distance between these two elements (i.e., master and each new border element) by speed of the sound in the fluid. Since the master element and each new border element can be located not aligned with the blast source, the distance calculation may include a consideration of the relative angle between the blast wave and the direction of the master element.

Finally, at action 112d, simulated fluid behaviors of each new border elements are determined by interpolating, with the calculated blast wave propagation time, the previously-stored simulated fluid behaviors of the corresponding master element's lookup table.

Figure 10:
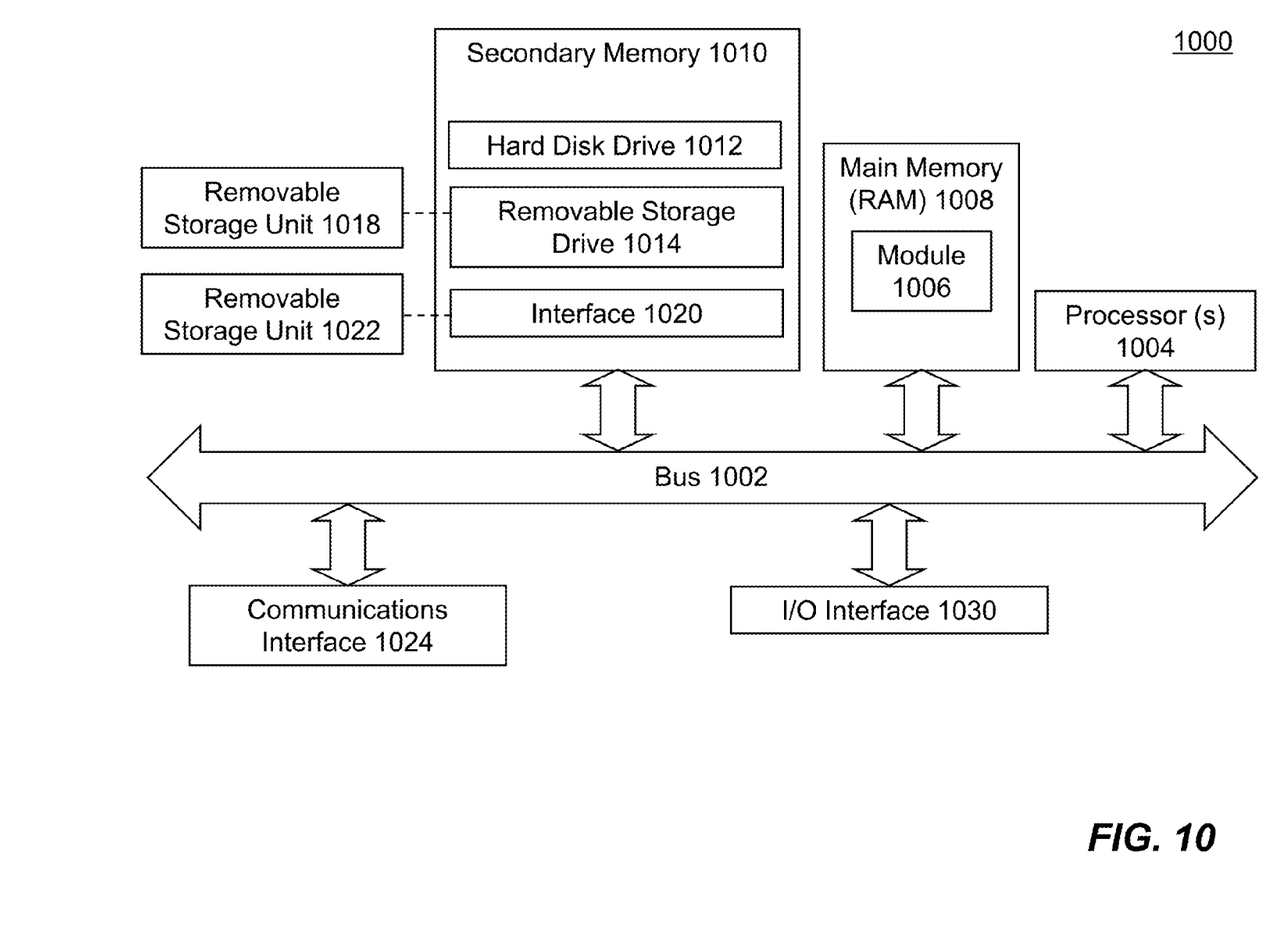
FIG. 10 is a function diagram showing salient components of a computer system, in which an embodiment of the present invention may be implemented.

According to one aspect, the present invention is directed towards one or more computer systems capable of carrying out the functionality described herein. An example of a computer system 1000 is shown in FIG. 10. The computer system 1000 includes one or more processors, such as processor 1004. The processor 1004 is connected to a computer system internal communication bus 1002. Various software embodiments are described in terms of this exemplary computer system. After reading this description, it will become apparent to a person skilled in the relevant art(s) how to implement the invention using other computer systems and/or computer architectures.

Computer system 1000 also includes a main memory 1008, preferably random access memory (RAM), and may also include a secondary memory 1010. The secondary memory 1010 may include, for example, one or more hard disk drives 1012 and/or one or more removable storage drives 1014, representing a floppy disk drive, a magnetic tape drive, an optical disk drive, flash memory card reader, etc. The removable storage drive 1014 reads from and/or writes to a removable storage unit 1018 in a well-known manner. Removable storage unit 1018, represents a floppy disk, magnetic tape, optical disk, flash memory, etc. which is read by and written to by removable storage drive 1014. As will be appreciated, the removable storage unit 1018 includes a computer recordable storage medium having stored therein computer software and/or data.

In alternative embodiments, secondary memory 1010 may include other similar means for allowing computer programs or other instructions to be loaded into computer system 1000. Such means may include, for example, a removable storage unit 1022 and an interface 1020. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 1022 and interfaces 1020 which allow software and data to be transferred from the removable storage unit 1022 to computer system 1000. In general, Computer system 1000 is controlled and coordinated by operating system (OS) software, which performs tasks such as process scheduling, memory management, networking and I/O services.

There may also be a communications interface 1024 connecting to the bus 1002. Communications interface 1024 allows software and data to be transferred between computer system 1000 and external devices. Examples of communications interface 1024 may include a modem, a network interface (such as an Ethernet card), a communications port, a Personal Computer Memory Card International Association (PCMCIA) slot and card, etc.

The computer 1000 communicates with other computing devices over a data network based on a special set of rules (i.e., a protocol). One of the common protocols is TCP/IP (Transmission Control Protocol/Internet Protocol) commonly used in the Internet. In general, the communication interface 1024 manages the assembling of a data file into smaller packets that are transmitted over the data network or reassembles received packets into the original data file. In addition, the communication interface 1024 handles the address part of each packet so that it gets to the right destination or intercepts packets destined for the computer 1000.

In this document, the terms "computer program medium" and "computer recordable medium" are used to generally refer to media such as removable storage drive 1014, and/or a hard disk installed in hard disk drive 1012. These computer program products are means for providing software to computer system 1000. The invention is directed to such computer program products.

The computer system 1000 may also include an input/output (I/O) interface 1030, which provides the computer system 1000 to access monitor, keyboard, mouse, printer, scanner, plotter, and alike.

Computer programs (also called computer control logic) are stored as application modules 1006 in main memory 1008 and/or secondary memory 1010. Computer programs may also be received via communications interface 1024. Such computer programs, when executed, enable the computer system 1000 to perform the features of the present invention as discussed herein. In particular, the computer programs, when executed, enable the processor 1004 to perform features of the present invention. Accordingly, such computer programs represent controllers of the computer system 1000.

In an embodiment where the invention is implemented using software, the software may be stored in a computer program product and loaded into computer system 1000 using removable storage drive 1014, hard drive 1012, or communications interface 1024. The application module 1006, when executed by the processor 1004, causes the processor 1004 to perform the functions of the invention as described herein.

The main memory 1008 may be loaded with one or more application modules 1006 (e.g., finite element analysis application module based on ALE technique) that can be executed by one or more processors 1004 with or without a user input through the I/O interface 1030 to achieve desired tasks. In operation, when at least one processor 1004 executes one of the application modules 1006, the results are computed and stored in the secondary memory 1010 (i.e., hard disk drive 1012). The result and/or status of the ALE based finite element analysis (e.g., fluid behaviors) is reported to the user via the I/O interface 1030 either in a text or in a graphical representation to a monitor coupled to the computer.

Although the present invention has been described with reference to specific embodiments thereof, these embodiments are merely illustrative, and not restrictive of, the present invention. Various modifications or changes to the specifically disclosed exemplary embodiments will be suggested to persons skilled in the art. For example, whereas the time step size ($\Delta t$) has been shown as a constant. Non-constant time step size can also be used to achieve the same. In summary, the scope of the invention should not be restricted to the specific exemplary embodiments disclosed herein, and all modifications that are readily suggested to those of ordinary skill in the art should be included within the spirit and purview of this application and scope of the appended claims.

I claim:

1. A method of conducting a time-marching numerical simulation of an underwater explosion comprising:
    receiving, in a computer system having an Arbitrary Lagrangian-Eulerian (ALE) based finite element analysis (FEA) application module installed thereon, characteristics of an underwater blast source and a FEA model having a plurality of nodes connected by a plurality of finite elements representing a fluid domain surrounding the blast source;
    identifying, by the ALE based FEA application module, those nodes and finite elements located on the fluid domain's original outer boundary as original border nodes and original border elements, respectively;
    creating, by the ALE based FEA application module, one layer of new border nodes to form one layer of new border elements outside of the fluid domain's original outer boundary between the original border nodes and the new border nodes, the new border elements being so sized that none of the new border elements is smaller than smallest one of the original border elements;
    associating, by the ALE based FEA application module, each of the new border elements with a closest neighboring original border element as corresponding master element, and each of the new border nodes with a closet original border node as corresponding master node;
    obtaining, by the ALE based FEA application module, simulated fluid behaviors as a result of an underwater explosion originated from the blast source by conducting a time-marching numerical simulation using the modified FEA model for a predetermined duration in a plurality of time steps;
    at each time step, performing, by the ALE based FEA application module, operations for avoiding blast wave reflections from the fluid domain's original outer boundary as follows:
    (a) computing said simulated fluid behaviors of all of the finite elements except the new border elements, said simulated fluid behaviors including at least element strains, element stresses, and nodal velocities;
    (b) saving said simulated fluid behaviors of the original border elements and the original border nodes into respective lookup tables with each lookup table per said each of the original border elements, said each lookup table being configured to store said simulated fluid behaviors for a predefined number of time steps in a first-in-first-out manner;
    (c) calculating a blast wave propagation time for said each of the new border elements from the corresponding master element;
    (d) determining said simulated fluid behaviors of said each of new border elements by interpolating, with the calculated blast wave propagation time, the previously-stored simulated fluid behaviors in the corresponding master element's lookup table.

2. The method of claim 1, wherein the FEA model represents a portion of the fluid domain due to geometric symmetry.

3. The method of claim 1, wherein the characteristics of the underwater blast source include the blast source's location, and blast wave velocity and pressure of the blast source.

4. The method of claim 1, wherein each of the finite elements comprises an eight-node solid finite element in three dimensional space.

5. The method of claim 1, wherein each of the finite elements comprises a four-node plate finite element in two dimensional space.

6. The method of claim 1, wherein said simulated fluid behaviors further include element history variables for the finite elements having non-linear material properties.

7. The method of claim 1, wherein the lookup table represents a sliding window of time for the duration of the time-marching simulation.

8. A system for conducting a time-marching numerical simulation of an underwater explosion comprising:
a main memory for storing computer readable code for an Arbitrary Lagrangian-Eulerian (ALE) based finite element analysis (FEA) application module;
at least one processor coupled to the main memory, said at least one processor executing the computer readable code in the main memory to cause the ALE based FEA application module to perform operations of:
receiving characteristics of an underwater blast source and a FEA model having a plurality of nodes connected by a plurality of finite elements representing a fluid domain surrounding the blast source;
identifying those nodes and finite elements located on the fluid domain's original outer boundary as original border nodes and original border elements, respectively;
creating one layer of new border nodes to form one layer of new border elements outside of the fluid domain's original outer boundary between the original border nodes and the new border nodes, the new border elements being so sized that none of the new border elements is smaller than smallest one of the original border elements;
associating each of the new border elements with a closest neighboring original border element as corresponding master element, and each of the new border nodes with a closet original border node as corresponding master node;
obtaining simulated fluid behaviors as a result of an underwater explosion originated from the blast source by conducting a time-marching numerical simulation using the modified FEA model for a predetermined duration in a plurality of time steps;
at each time step, performing operations for avoiding blast wave reflections from the fluid domain's original outer boundary as follows:
(a) computing said simulated fluid behaviors of all of the finite elements except the new border elements, said simulated fluid behaviors including at least element strains, element stresses, and nodal velocities;
(b) saving said simulated fluid behaviors of the original border elements and the original border nodes into respective lookup tables with each lookup table per said each of the original border elements, said each lookup table being configured to store said simulated fluid behaviors for a predefined number of time steps in a first-in-first-out manner;
(c) calculating a blast wave propagation time for said each of the new border elements from the corresponding master element;
(d) determining said simulated fluid behaviors of said each of new border elements by interpolating, with the calculated blast wave propagation time, the previously-stored simulated fluid behaviors in the corresponding master element's lookup table.

9. The system of claim 8, wherein the FEA model represents a portion of the fluid domain due to geometric symmetry.

10. The system of claim 8, wherein the characteristics of the underwater blast source include the blast source's location, and blast wave velocity and pressure of the blast source.

11. The system of claim 8, wherein each of the finite elements comprises an eight-node solid finite element in three dimensional space.

12. The system of claim 8, wherein each of the finite elements comprises a four-node plate finite element in two dimensional space.

13. The system of claim 8, wherein said simulated fluid behaviors further include element history variables for the finite elements having non-linear material properties.

14. The system of claim 8, wherein the lookup table represents a sliding window of time for the duration of the time-marching simulation.

15. A non-transitory computer usable storage medium containing instructions for controlling a computer system for conducting a time-marching numerical simulation of an underwater explosion by a method comprising:
receiving, in a computer system having an Arbitrary Lagrangian-Eulerian (ALE) based finite element analysis (FEA) application module installed thereon, characteristics of an underwater blast source and a FEA model having a plurality of nodes connected by a plurality of finite elements representing a fluid domain surrounding the blast source;
identifying, by the ALE based FEA application module, those nodes and finite elements located on the fluid domain's original outer boundary as original border nodes and original border elements, respectively;
creating, by the ALE based FEA application module, one layer of new border nodes to form one layer of new border elements outside of the fluid domain's original outer boundary between the original border nodes and the new border nodes, the new border elements being so sized that none of the new border elements is smaller than smallest one of the original border elements;
associating, by the ALE based FEA application module, each of the new border elements with a closest neighboring original border element as corresponding master element, and each of the new border nodes with a closet original border node as corresponding master node;
obtaining, by the ALE based FEA application module, simulated fluid behaviors as a result of an underwater explosion originated from the blast source by conducting a time-marching numerical simulation using the modified FEA model for a predetermined duration in a plurality of time steps;
at each time step, performing, by the ALE based FEA application module, operations for avoiding blast wave reflections from the fluid domain's original outer boundary as follows:
(a) computing said simulated fluid behaviors of all of the finite elements except the new border elements, said simulated fluid behaviors including at least element strains, element stresses, and nodal velocities;
(b) saving said simulated fluid behaviors of the original border elements and the original border nodes into respective lookup tables with each lookup table per said each of the original border elements, said each lookup table being configured to store said simulated fluid behaviors for a predefined number of time steps in a first-in-first-out manner;
(c) calculating a blast wave propagation time for said each of the new border elements from the corresponding master element;
(d) determining said simulated fluid behaviors of said each of new border elements by interpolating, with the calculated blast wave propagation time, the previously-stored simulated fluid behaviors in the corresponding master element's lookup table.

16. The non-transitory computer usable storage medium of claim 15, wherein the FEA model represents a portion of the fluid domain due to geometric symmetry.

17. The non-transitory computer usable storage medium of claim 15, the characteristics of the underwater blast source include the blast source's location, and blast wave velocity and pressure of the blast source.

18. The non-transitory computer usable storage medium of claim 15, wherein each of the finite elements comprises an eight-node solid finite element in three dimensional space or a four-node plate finite element in two dimensional space.

19. The non-transitory computer usable storage medium of claim 15, wherein said simulated fluid behaviors further include element history variables for the finite elements having non-linear material properties.

20. The non-transitory computer usable storage medium of claim 15, wherein the lookup table represents a sliding window of time for the duration of the time-marching simulation.

\* \* \* \* \*